US010428933B2

(12) United States Patent
Mills

(10) Patent No.: US 10,428,933 B2
(45) Date of Patent: Oct. 1, 2019

(54) TRANSMISSION VALVE MANIFOLD AND METHOD OF MANUFACTURING A TRANSMISSION VALVE MANIFOLD

(71) Applicant: BorgWarner Inc., Auburn Hills, MI (US)

(72) Inventor: David C. Mills, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 411 days.

(21) Appl. No.: 15/273,787

(22) Filed: Sep. 23, 2016

(65) Prior Publication Data

US 2018/0087660 A1    Mar. 29, 2018

(51) Int. Cl.
*F16H 61/00* (2006.01)
*F15B 13/08* (2006.01)
*F16H 61/02* (2006.01)

(52) U.S. Cl.
CPC ....... *F16H 61/0009* (2013.01); *F15B 13/085* (2013.01); *F15B 13/0814* (2013.01); *F16H 61/0206* (2013.01); *F16H 61/0251* (2013.01)

(58) Field of Classification Search
CPC ............... F15B 13/0814; F15B 13/085; F16H 61/0009; F16H 61/0206; F16H 61/0251
USPC ........................................ 132/596.12; 91/459
See application file for complete search history.

(56) References Cited

U.S. PATENT DOCUMENTS

| | | | |
|---|---|---|---|
| 3,967,640 A * | 7/1976 | Bianchetta | F15B 13/08 137/269 |
| 4,357,955 A * | 11/1982 | Sauer | F15B 13/02 137/270 |
| 5,941,281 A | 8/1999 | Baumann et al. | |
| 6,095,196 A | 8/2000 | McCarty et al. | |
| 6,782,920 B2 | 8/2004 | Steinke | |
| 6,964,281 B2 * | 11/2005 | Pieper | F15B 13/0814 137/596.12 |
| 7,127,961 B2 * | 10/2006 | Braford | F16H 61/0009 74/340 |
| 7,913,713 B2 * | 3/2011 | Nelson | B60P 1/162 137/354 |
| 8,387,666 B2 | 3/2013 | Fagerlund et al. | |

(Continued)

FOREIGN PATENT DOCUMENTS

WO    WO-2014090465 A1 *    6/2014    ............. B60T 8/368

*Primary Examiner* — F Daniel Lopez
*Assistant Examiner* — Richard C Drake
(74) *Attorney, Agent, or Firm* — Harness, Dickey & Pierce, P.L.C.

(57) ABSTRACT

A transmission valve manifold can include a single, unitary, monolithic, manifold body (14). The body (14) can have a plurality of fluid passageways (550, 554, 558, 562, 566) and fluid chambers (130*a-d*, 134*a-d*, 326*a-f*, 338*a-c*, 510*a-h*). Each chamber (130*a-d*, 134*a-d*, 326*a-f*, 338*a-c*, 510*a-h*) can receive one of a cylinder body (142*a-d*, 146*a-d*), solenoid valve (22*a-f*), or spool valve (30*a-h*). A first passageway (550, 554, 558, 562, 566) can follow a path that extends along three axes through an interior of the body (14) to connect at least one of the chambers (130*a-d*, 134*a-d*, 326*a-f*, 338*a-c*, 510*a-h*) with at least one other chamber (130*a-d*, 134*a-d*, 326*a-f*, 338*a-c*, 510*a-h*). The first passageway (550, 554, 558, 562, 566) can overlap a second passageway (550, 554, 558, 562, 566) within the body (14). The body (14) can be manufactured by laser sintering of successive layers of laser sinterable material (1022).

10 Claims, 12 Drawing Sheets

(56) References Cited

U.S. PATENT DOCUMENTS

| | | |
|---|---|---|
| 8,826,938 B2 | 9/2014 | Moore |
| 9,834,056 B2 * | 12/2017 | Coombs ............. B60G 17/0155 |
| 2005/0199298 A1 | 9/2005 | Farrington |
| 2013/0276924 A1 | 10/2013 | Venkitasubramony et al. |
| 2014/0074947 A1 | 3/2014 | Piazza |
| 2015/0323186 A1 * | 11/2015 | Xu ......................... F02C 7/224 |
| | | 60/782 |

* cited by examiner

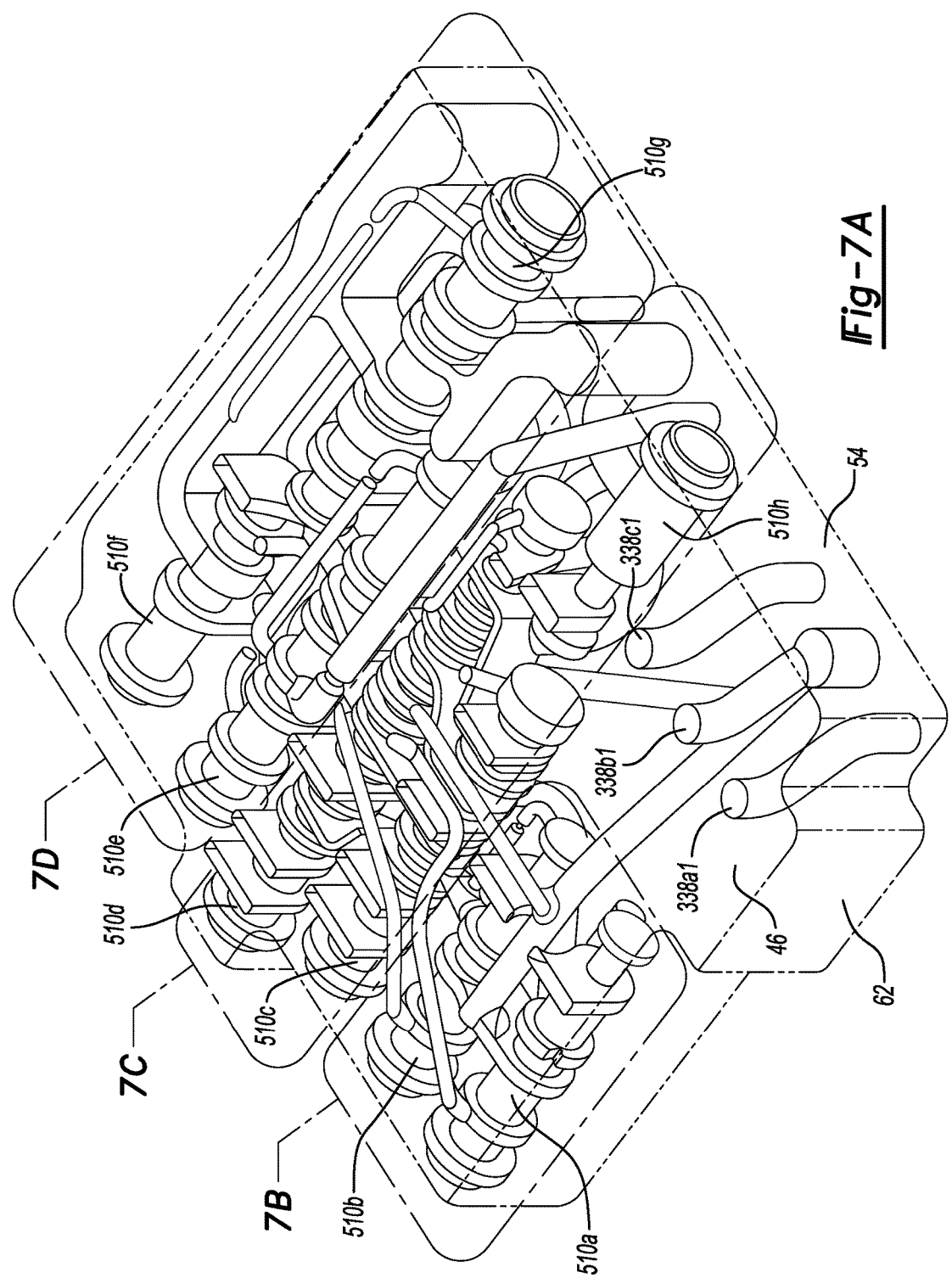

TRANSMISSION VALVE MANIFOLD AND METHOD OF MANUFACTURING A TRANSMISSION VALVE MANIFOLD

FIELD

The present disclosure relates to a transmission valve manifold and a method of manufacturing a transmission valve manifold.

BACKGROUND

This section provides background information related to the present disclosure which is not necessarily prior art.

Transmission valve manifolds typically consist of aluminum castings with worm trail routing of multiple connections between various working elements. These worm trail fluid paths typically must be two-dimensional, and cannot cross over another trail's path. Due to this two dimensional limitation of typical transmission valve manifolds, getting from one element to another can often require a lengthy and convoluted path that adds to the complexity and size of the casting.

One method of overcoming this two dimensional limitation includes manufacturing multiple valve manifold bodies, each having its own two dimensional worm trails, and connecting the valve manifold bodies with one or more separator plates configured to permit fluid communication between the worm trails of the valve manifold bodies in a third dimension at predetermined locations. Such separator plates require gasketed seals and precise machining of the gasket surfaces. These separator plates also only allow binary cross-over of hydraulic circuitry from one two dimensional worm trail casting to another two dimensional worm trail casting. Furthermore, the use of separator plates typically requires the use of additional threaded fasteners to connect the assembly together, which can increase cost and assembly time, and can also result in uneven gasket compression and distortion of valve bores. Such uneven compression and bore distortion can lead to gasket blow-out, gasket crushing, valve leakage, uneven wear, or sticking valves, for example. Additionally, the two dimensional worm trails of each valve manifold body must be routed around these threaded fasteners, adding further size and complexity.

SUMMARY

This section provides a general summary of the disclosure, and is not a comprehensive disclosure of its full scope or all of its features.

In one form, the present disclosure provides for a transmission valve manifold that can include a single, unitary, monolithic, manifold body. The manifold body can have a plurality of fluid passageways and a plurality of fluid chambers. Each fluid chamber can be configured to receive one of a cylinder body, a solenoid valve, or a spool valve. A first one of the fluid passageways can follow a path that extends along three axes through an interior of the manifold body to connect at least one of the fluid chambers with at least one other one of the fluid chambers. The first one of the fluid passageways can overlap a second one of the fluid passageways within the interior of the manifold body.

In another form, the present disclosure provides for a transmission valve manifold including a single, unitary, monolithic, manifold body, a plurality of actuator pistons, a plurality of spool valves, and a plurality of solenoid valves. The manifold body can have a plurality of fluid passageways, a plurality of piston chambers, a plurality of spool valve chambers, and a plurality of solenoid valve chambers. Each actuator piston can have a first cylinder body and a second cylinder body that is fixedly coupled to the first cylinder body. Each first cylinder body can be slidably disposed within a corresponding first one of the piston chambers. Each second cylinder body can be slidably disposed within a corresponding second one of the piston chambers. Each spool valve can be slidably disposed within a corresponding one of the spool valve chambers. Each solenoid valve can be mounted to the manifold body and can include a solenoid valve sleeve disposed within one of the solenoid valve chambers. Each of the fluid passageways can extend through the manifold body to connect at least one of the piston chambers with at least one of the spool valve chambers or at least one of the solenoid valve chambers. A first one of the fluid passageways can follow a fluid path along three axes to overlap with a second one of the fluid passageways within the interior of the manifold body.

In another form, the present disclosure provides for a method of manufacturing a transmission valve manifold. The method can include the steps of applying a layer of laser sinterable material, applying laser energy to the laser sinterable material at predetermined locations to solidify the laser sinterable material at the predetermined locations, determining whether a final layer of the transmission valve manifold has been solidified and repeating the steps of applying a layer of laser sinterable material and applying laser energy at predetermined locations until a final layer of the transmission valve manifold has been solidified such that the transmission valve manifold is a single, unitary, monolithic body including a plurality of fluid passageways that extend between a plurality of fluid chambers, at least one of the fluid passageways extending along a path that travels along three axes to cross over at least one other fluid passageway.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
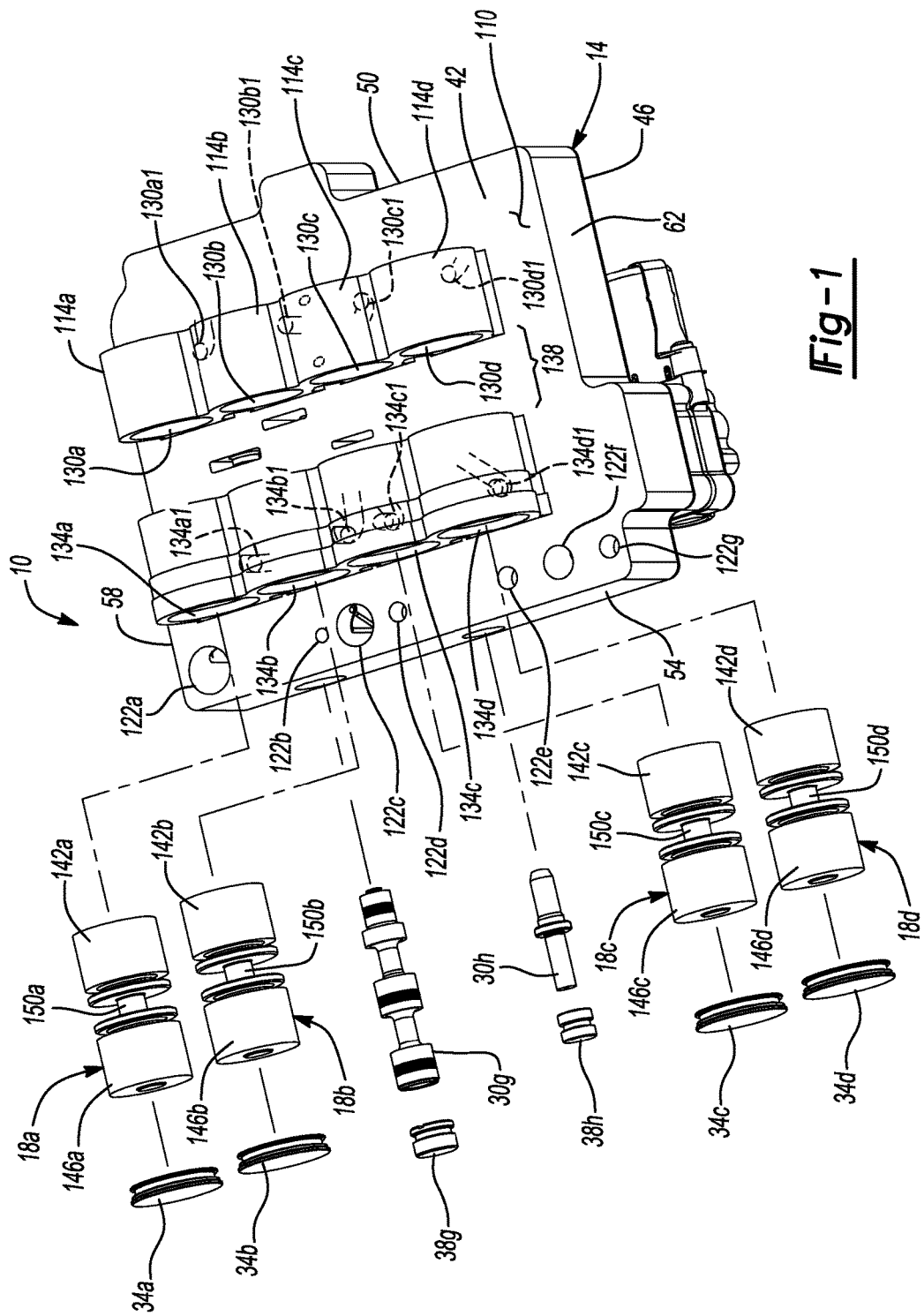
FIG. 1 is a top perspective view of a transmission valve manifold, illustrating some internal components exploded out from a manifold body.
Figure 5:
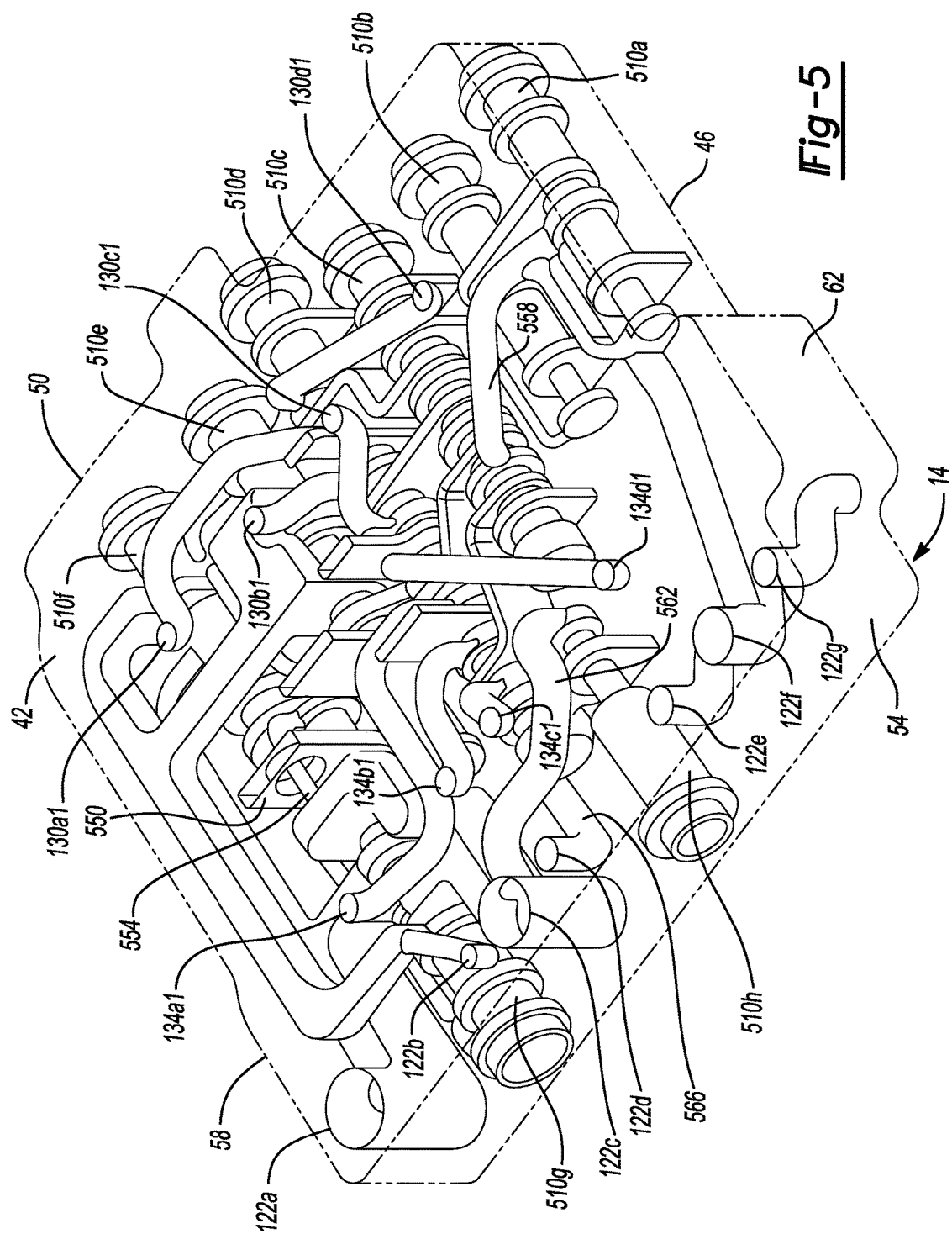
Figure 6:
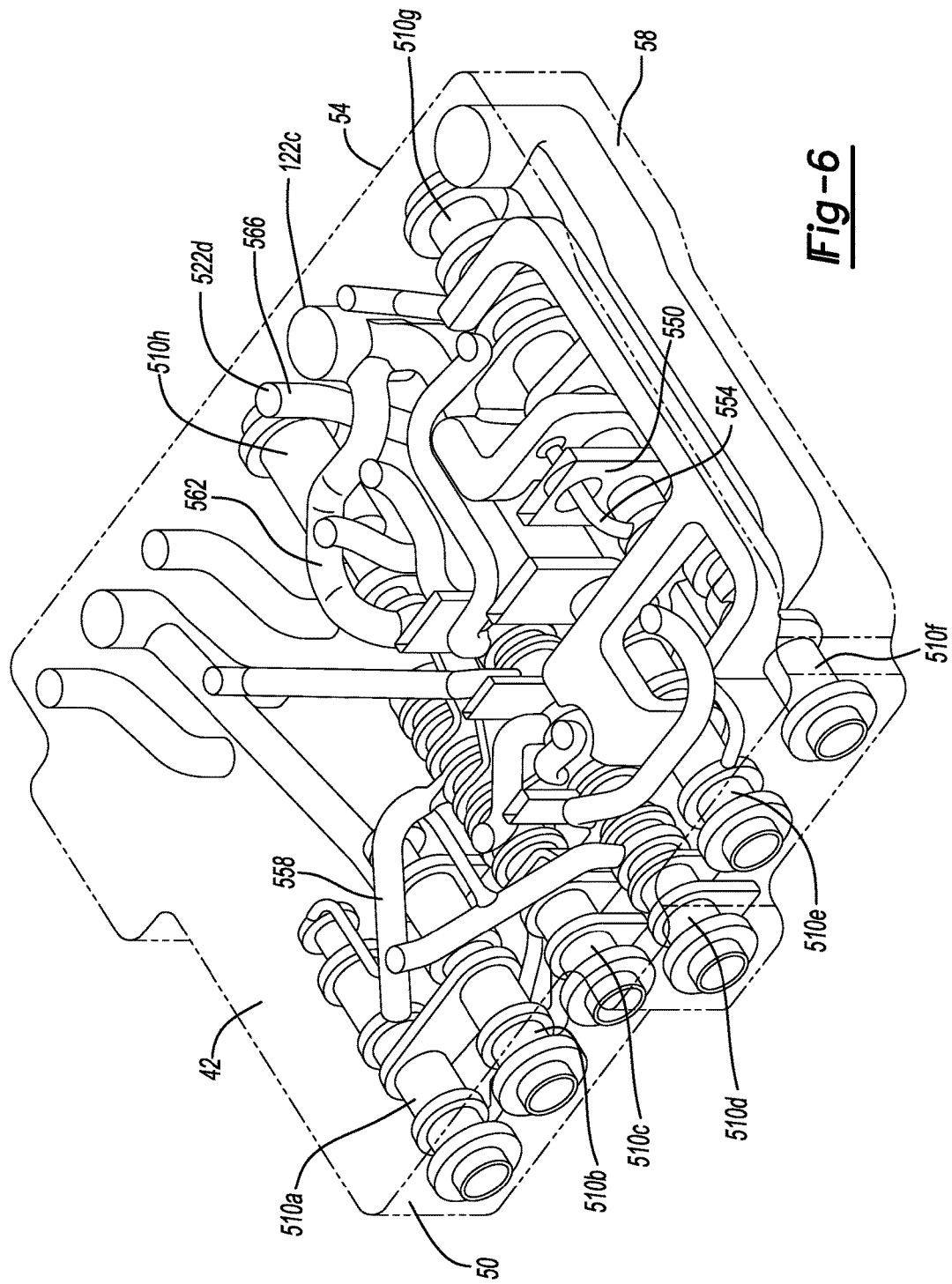
Figure 7B:
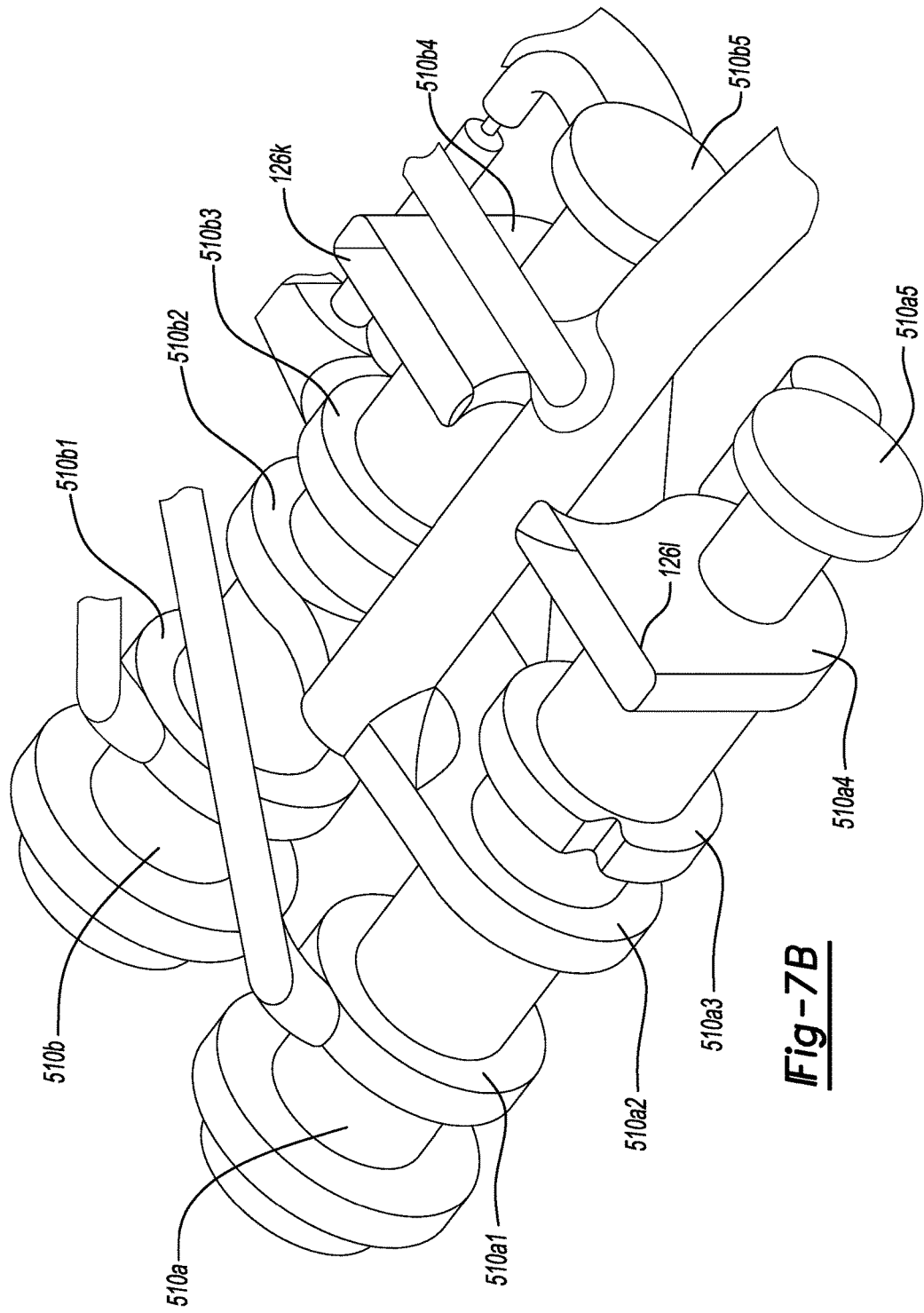
Figure 7C:
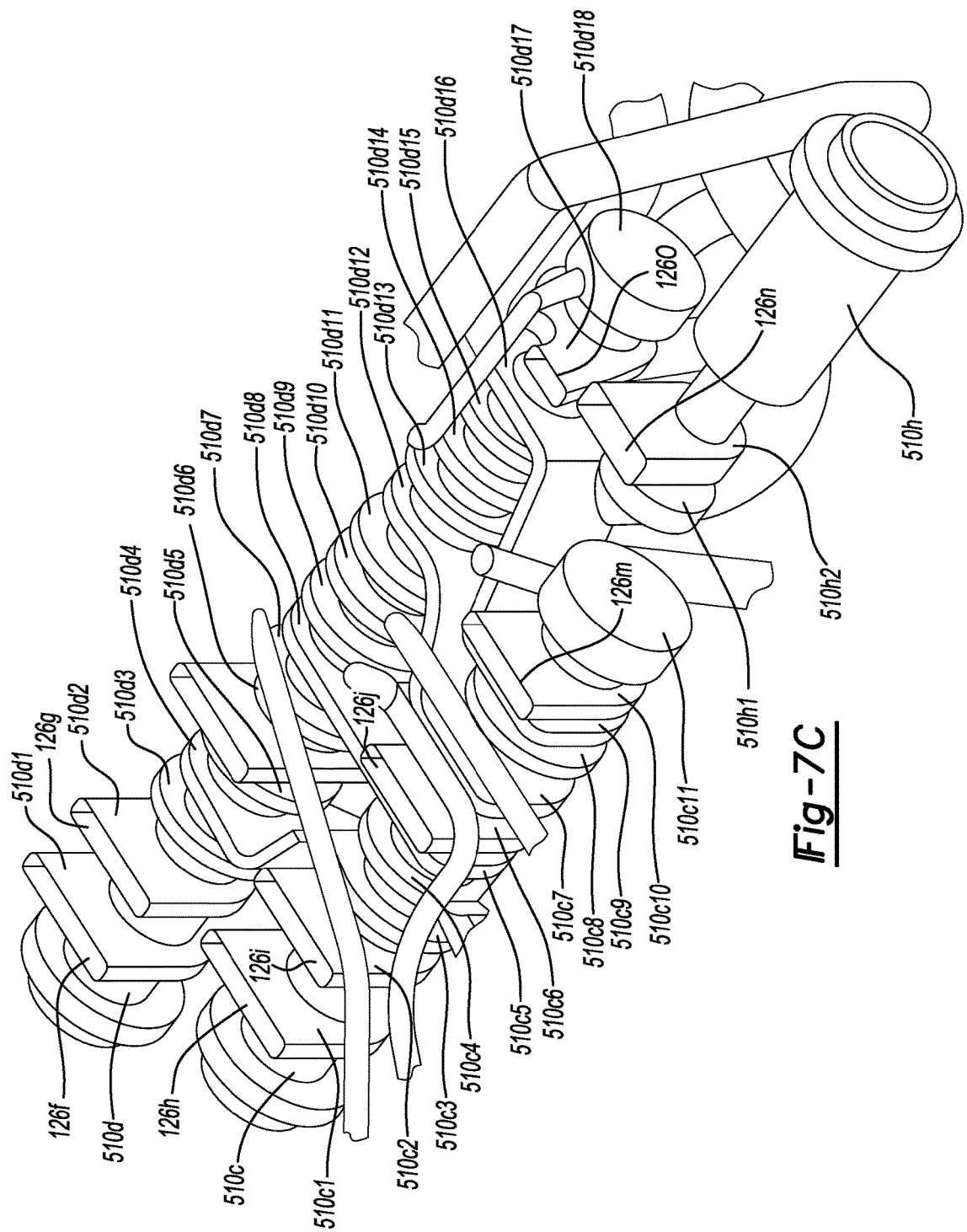
Figure 7D:
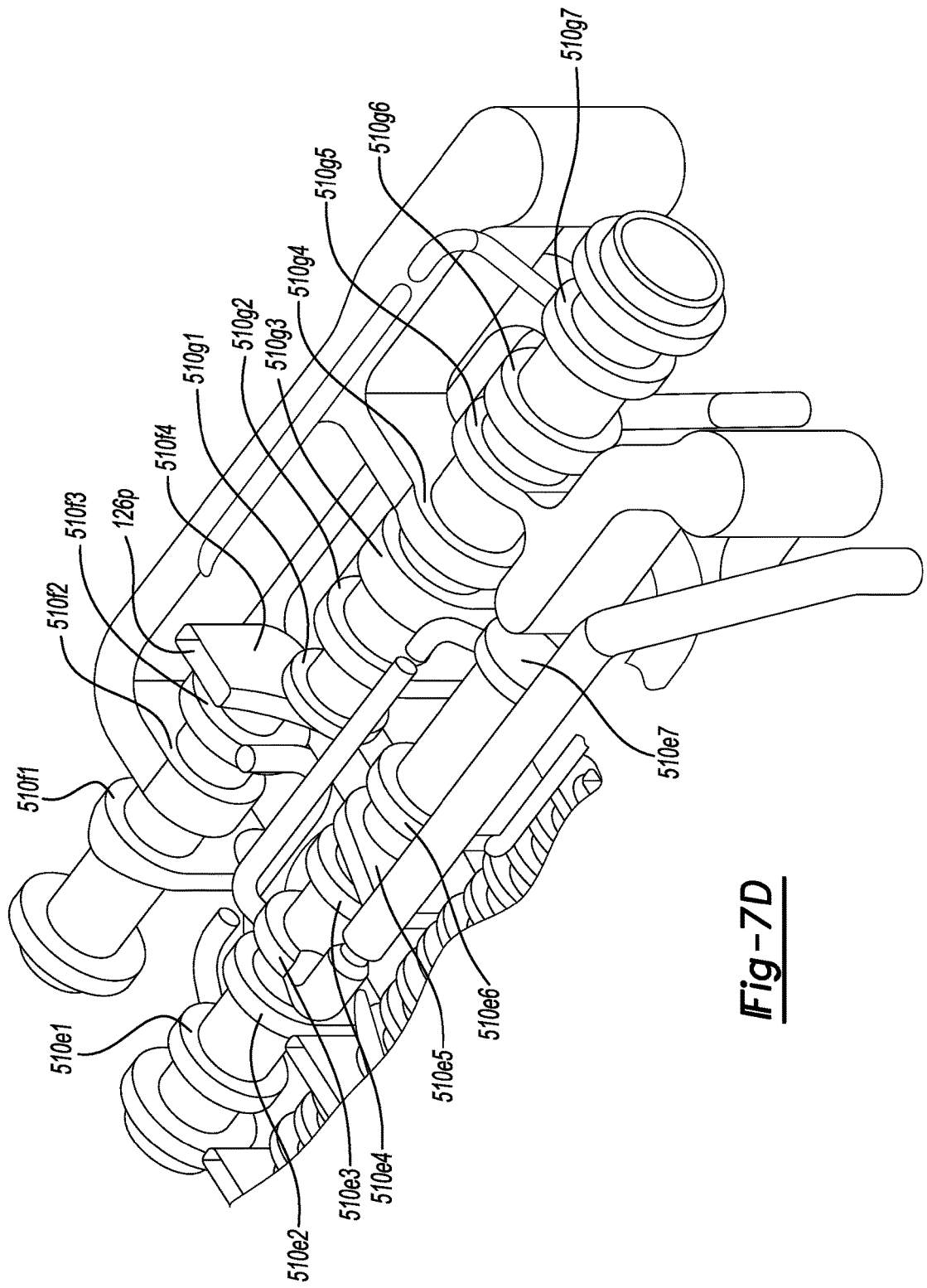
Figure 8:
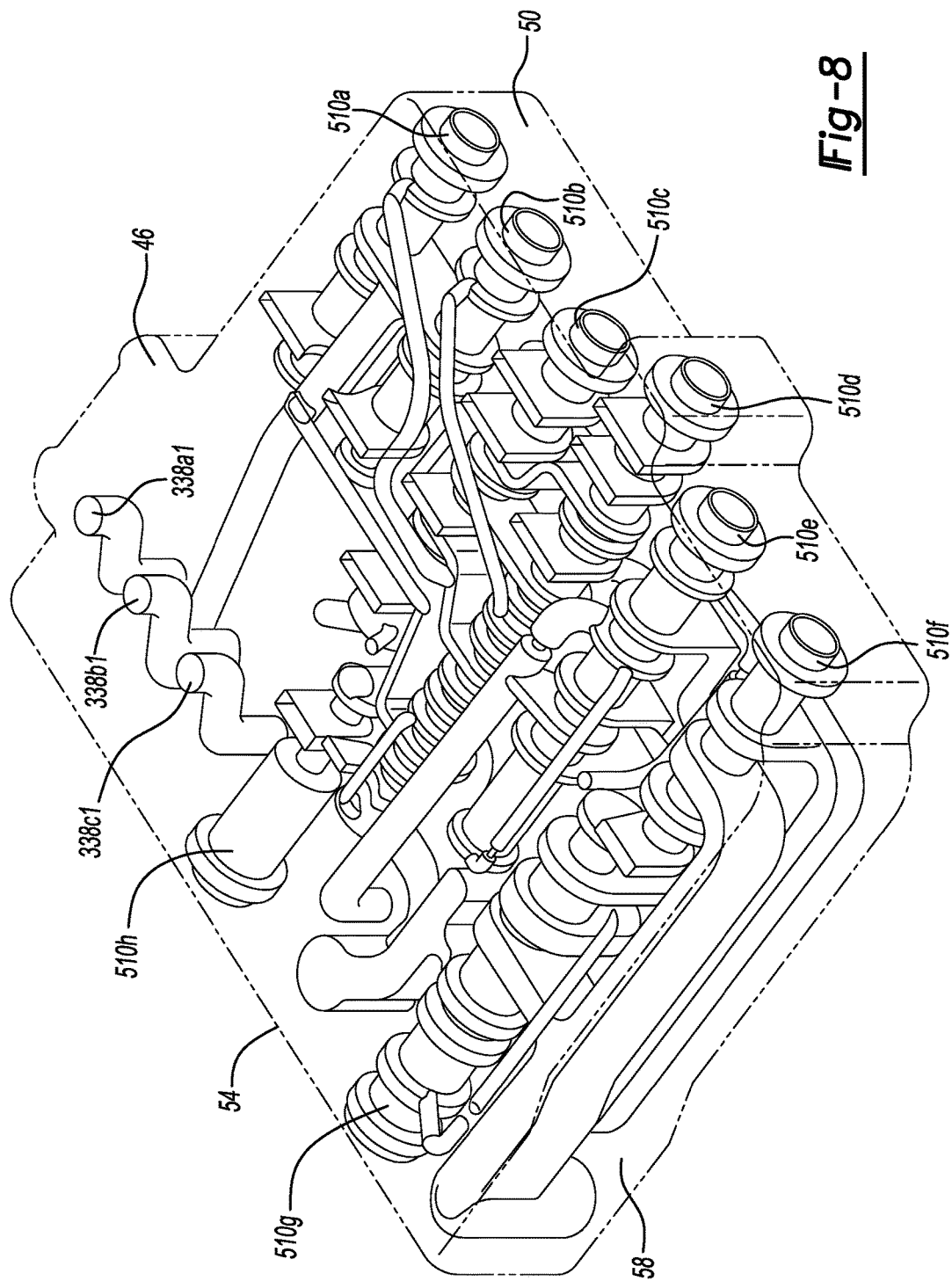
Figure 9:
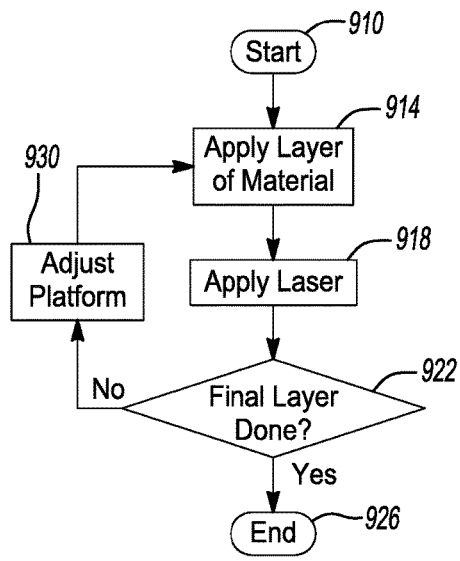
Figure 10:
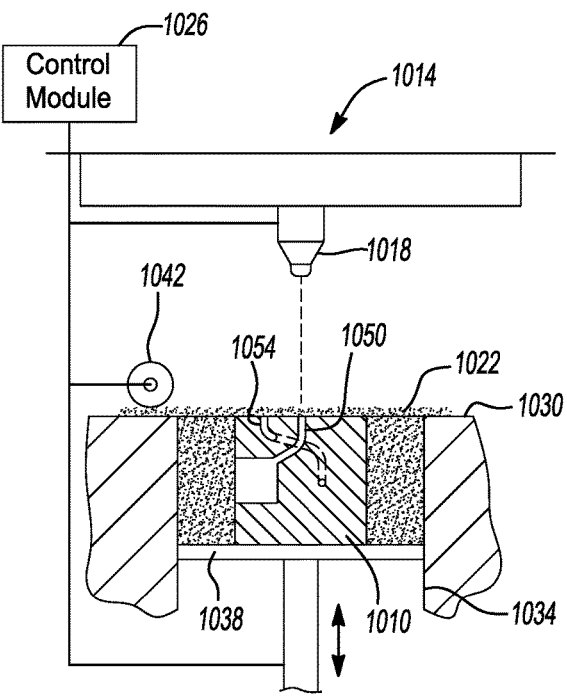
Figure 11:
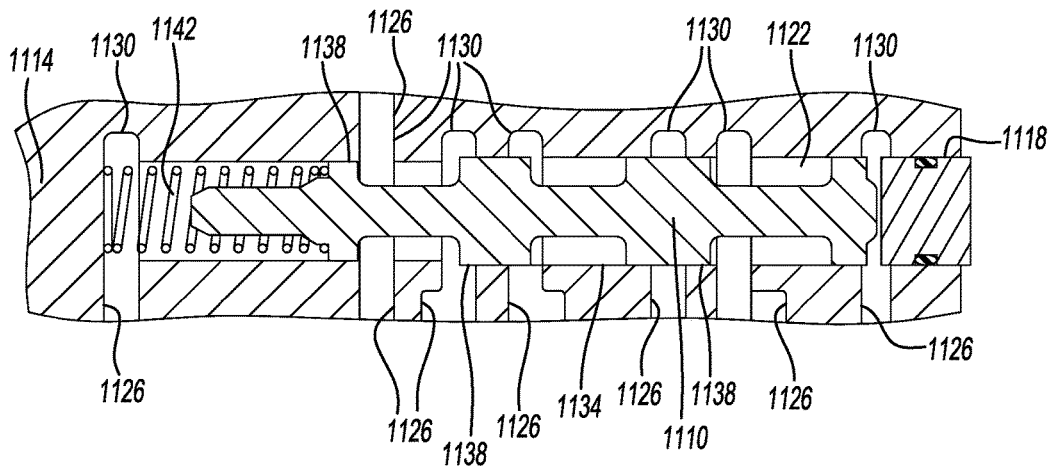

FIG. 5. is a top perspective view of a portion of the transmission valve manifold shown in FIG. 1, with a portion of the manifold body shown in phantom lines to illustrate a plurality of internal cavities and passageways of the manifold body;

FIG. 6 is a different top perspective view of the portion of the transmission valve manifold shown in FIG. 5;

FIG. 7A is a bottom perspective view of the portion of the transmission valve manifold shown in FIG. 5;

FIG. 7B is a zoomed in view of a portion of the perspective view of FIG. 7A;

FIG. 7C is a zoomed in view of another portion of the perspective view of FIG. 7A;

FIG. 7D is a zoomed in view of another portion of the perspective view of FIG. 7A;

FIG. 8 is a different bottom perspective view of the portion of the transmission valve manifold shown in FIG. 7A;

FIG. 9 is a method of manufacturing the transmission valve manifold of FIG. 1, illustrated in flow chart format;

FIG. 10 is a schematic cross-sectional view of a laser sintering device and a portion of the transmission valve manifold of FIG. 1 during manufacturing with the laser sintering device; and FIG. 11 is a sectional view of an example of a spool valve within an example transmission valve manifold, similar to the transmission valve manifold of FIG. 1.

Corresponding reference numerals indicate corresponding parts throughout the several views of the drawings.

DETAILED DESCRIPTION

Example embodiments will now be described more fully with reference to the accompanying drawings.

Figure 2:
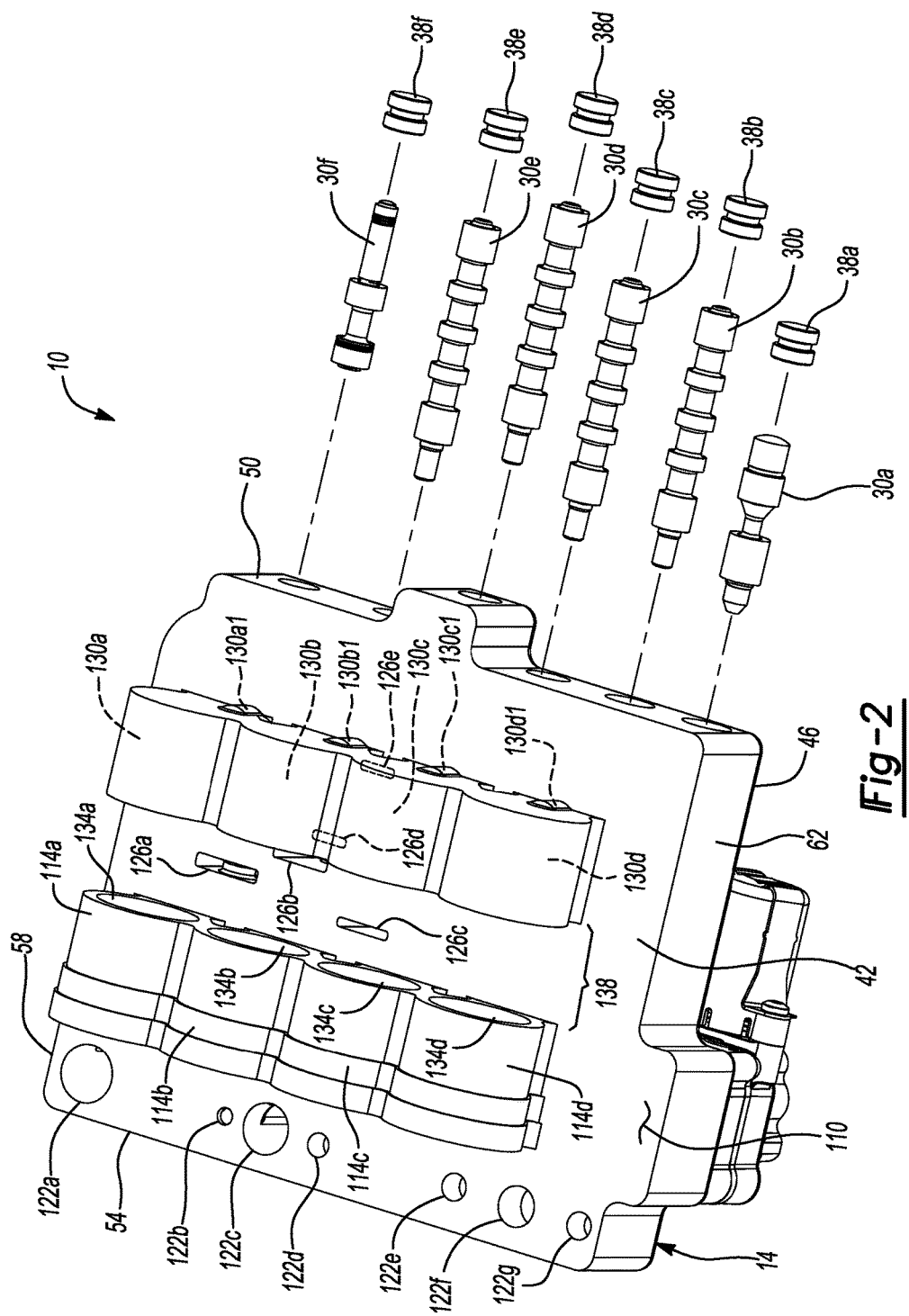
FIG. 2 is a different top perspective view of the transmission valve manifold shown in FIG. 1, illustrating some other internal components exploded out from the manifold body.

With reference to FIGS. 1-4, a transmission valve manifold assembly 10 can include a valve manifold body 14, a plurality of shift actuation pistons 18a, 18b, 18c, 18d (shown in FIG. 1), a plurality of individual solenoid actuators 22a, 22b, 22c, 22d, 22e, 22f (shown in FIG. 4), a paired solenoid actuator 26 (shown in FIGS. 1, 2, and 4), a plurality of spool valves 30a, 30b, 30c, 30d, 30e, 30f, 30g, 30h (shown in FIGS. 1 and 2), a plurality of actuation piston caps 34a, 34b, 34c, 34d (shown in FIG. 1), and a plurality of spool valve cylinder caps 38a, 38b, 38c, 38d, 38e, 38f, 38g, 38h (shown in FIGS. 1 and 2). While not specifically shown, a lead frame can also be provided on the manifold body 14 for an electrical wiring harness connection.

The valve manifold body 14 is in the form of a single unitary, monolithic, metal body that can be manufactured by an additive manufacturing process such as laser sintering, as described in greater detail below. The valve manifold body 14 can have a top side 42, a bottom side 46, a front side 50 (i.e., first side), a back side 54 (i.e., second side), a left side 58 (i.e., third side), and a right side 62 (i.e., fourth side). The top side 42 can be opposite the bottom side 46. The front, back, left, and right sides 50, 54, 58, 62 can extend generally between the top and bottom sides 42, 46, with the front side 50 being opposite the back side 54, and the left side being opposite the right side 62 to form an overall, general polygonal shape, though other configurations can be used.

With specific reference to FIGS. 1 and 2, the top side 42 can have a top surface 110 and can include a plurality of piston housings 114a, 114b, 114c, 114d, that extend up from the top surface 110. The top surface 110 can abut a surface 118 of a housing of a transmission 120 (shown in FIG. 4). The top surface 110 can include a plurality of ports 122a, 122b, 122c, 122d, 122e, 122f, 122g. In the example provided, the top surface 110 can also include a plurality of vent apertures 126a, 126b, 126c, 126d, 126e. While the example provided includes seven ports and five vent apertures in the top surface 110, those of skill in the art will appreciate that other configurations or numbers of vents or ports can be used. The ports 122a-g and vent apertures 126a-e, are described in greater detail below.

In the example provided, the piston housings 114a-d are aligned in an array across the top side 42 of the valve manifold body 14, generally from the left side 58 to the right side 62. Each piston housing 114a-d can include a hollow forward portion that defines a cylindrical forward piston cavity 130a, 130b, 130c, 130d, and a hollow rearward portion that defines a cylindrical rearward piston cavity 134a, 134b, 134c, 134d that is coaxial with the corresponding forward piston cavity 130a-d. In the example provided, the axes of the forward and rearward piston cavities 130a-d, 134a-d can be parallel to the top surface 110 and perpendicular to the front side 50.

The forward portion can be proximate to the front side 50 and axially offset from the rearward portion, which can be proximate to the back side 54, such that there is a gap 138 between the forward and rearward portions. The rearward axial end of each forward piston cavity 130a-d and the forward axial end of the rearward piston cavity 134a-d can be open to the gap 138. In the example provided, the forward axial end of each forward piston cavity 130a-d is not open through the forward portion of the piston housing 114a-d, such that the forward axial end of each forward portion is closed by an integral wall of the piston housing 114a-d. In the example provided, the rearward axial end of the rearward piston cavity 134a-d can be open through the rearward portion, but can be sealed by the corresponding actuation piston cap 34a-d.

Each forward piston cavity 130a-d, can include an inlet/outlet 130a1, 130b1, 130c1, 130d1 proximate to the forward axial end of the forward piston cavity 130a-d. Each rearward piston cavity 134a-d can also include an inlet/outlet 134a1, 134b1, 134c1, 134d1 proximate to the rearward axial end of the rearward piston cavity 134a-d.

Each actuator piston 18a-d can include a forward cylinder body 142a, 142b, 142c, 142d, a rearward cylinder body 146a, 146b, 146c, 146d, and a connecting portion 150a, 150b, 150c, 150d that extends axially therebetween to fixedly couple the forward cylinder body 142a-d to the rearward cylinder body 146a-d. Each actuator piston 18a-d can be disposed within the corresponding piston housing 114a-d, such that the forward cylinder body 142a-d is within the forward piston cavity 130a-d, the rearward cylinder body 146a-d is within the rearward piston cavity 134a-d, and the connecting portion 150a-d is generally located within the gap 138.

The actuation piston caps 34a-d can seal the rearward cylinder bodies 146a-d within the rearward piston cavities 134a-d. The forward cylinder body 142a-d can be axially slidable within the forward piston cavity 130a-d while forming a seal with the inner circumferential surface of the forward piston cavity 130a-d. The rearward cylinder body 146a-d can be axially slidable within the rearward piston cavity 134a-d while forming a seal with the inner circumferential surface of the rearward piston cavity 134a-d. Accordingly, introduction of a fluid (e.g., hydraulic or lubricating oil) to the forward piston cavity 130a-d via the inlet/outlet 130a1-d1 can move the actuator piston 18a-d axially in the rearward direction, while introduction of fluid to the rearward piston cavity 134a-d via the inlet/outlet 134a1-d1 can move the actuator piston 18a-d axially in the forward direction.

A corresponding shift fork (not shown) can be mounted to each connecting portion 150a-d for common axial movement therewith and can extend up and out through the gap 138. While not specifically shown, each shift fork can be attached to gear synchronizers that engage and disengage gears of the transmission 120 (shown in FIG. 3).

The ports 122a-g can be coupled for fluid communication with the housing of the transmission 120 (shown in FIG. 4), such that the ports 122a-g can be in fluid communication with different devices through the transmission 120. For example, the ports 122a-g can be coupled to a corresponding one of a return line of a pump (not shown), an outlet of a cooling fluid circuit (not shown), a supply line of the pump (not shown), a clutch lubrication circuit (not shown), a clutch actuator (not shown) corresponding to the odd numbered gears (not shown) of the transmission 120, a filtered fluid inlet (not shown), or a clutch actuator (not shown) corresponding to the even numbered gears (not shown) of the transmission 120, though other devices can be used.

Figure 3:
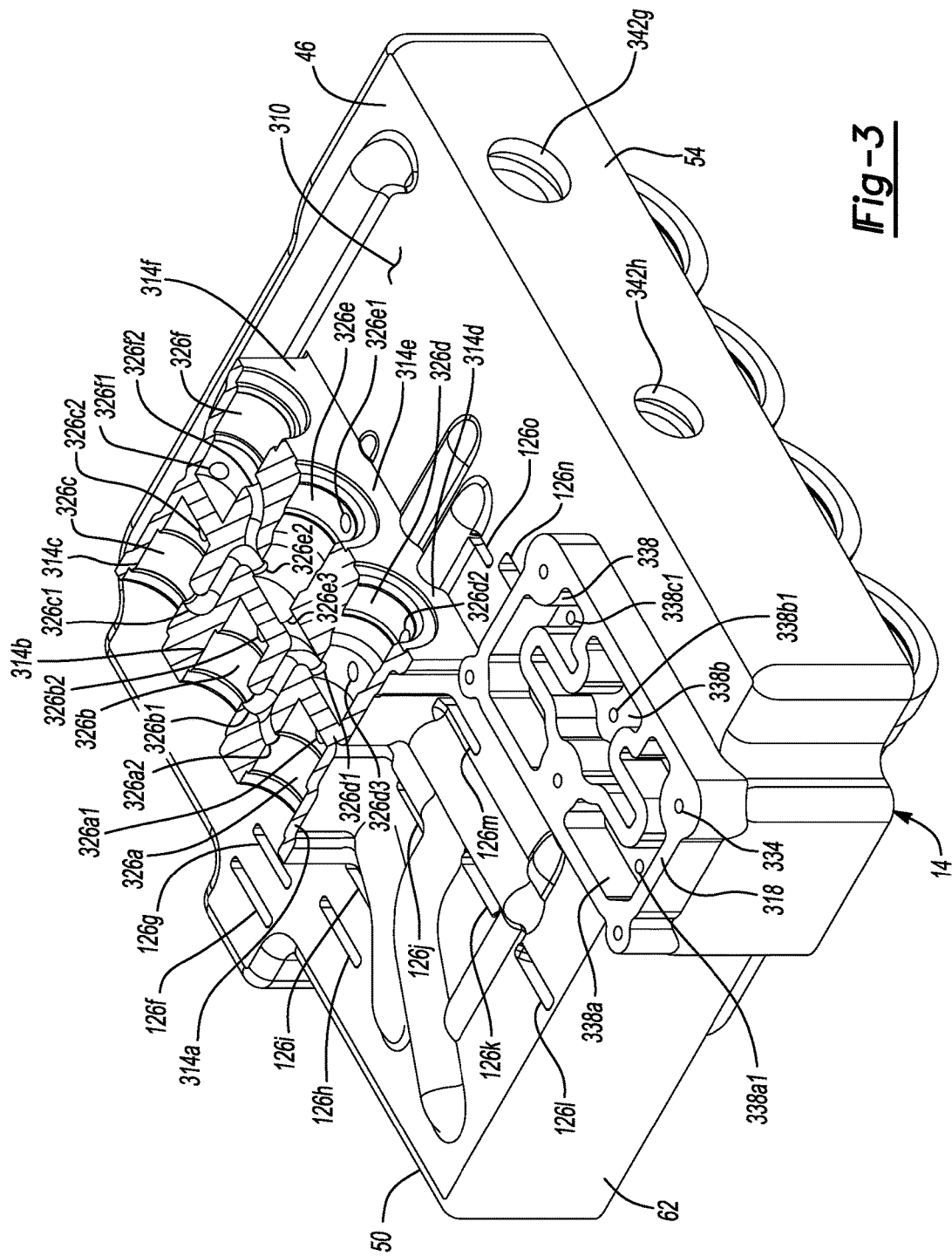
FIG. 3 is a bottom perspective view of the manifold body shown in FIG. 1.
Figure 4:
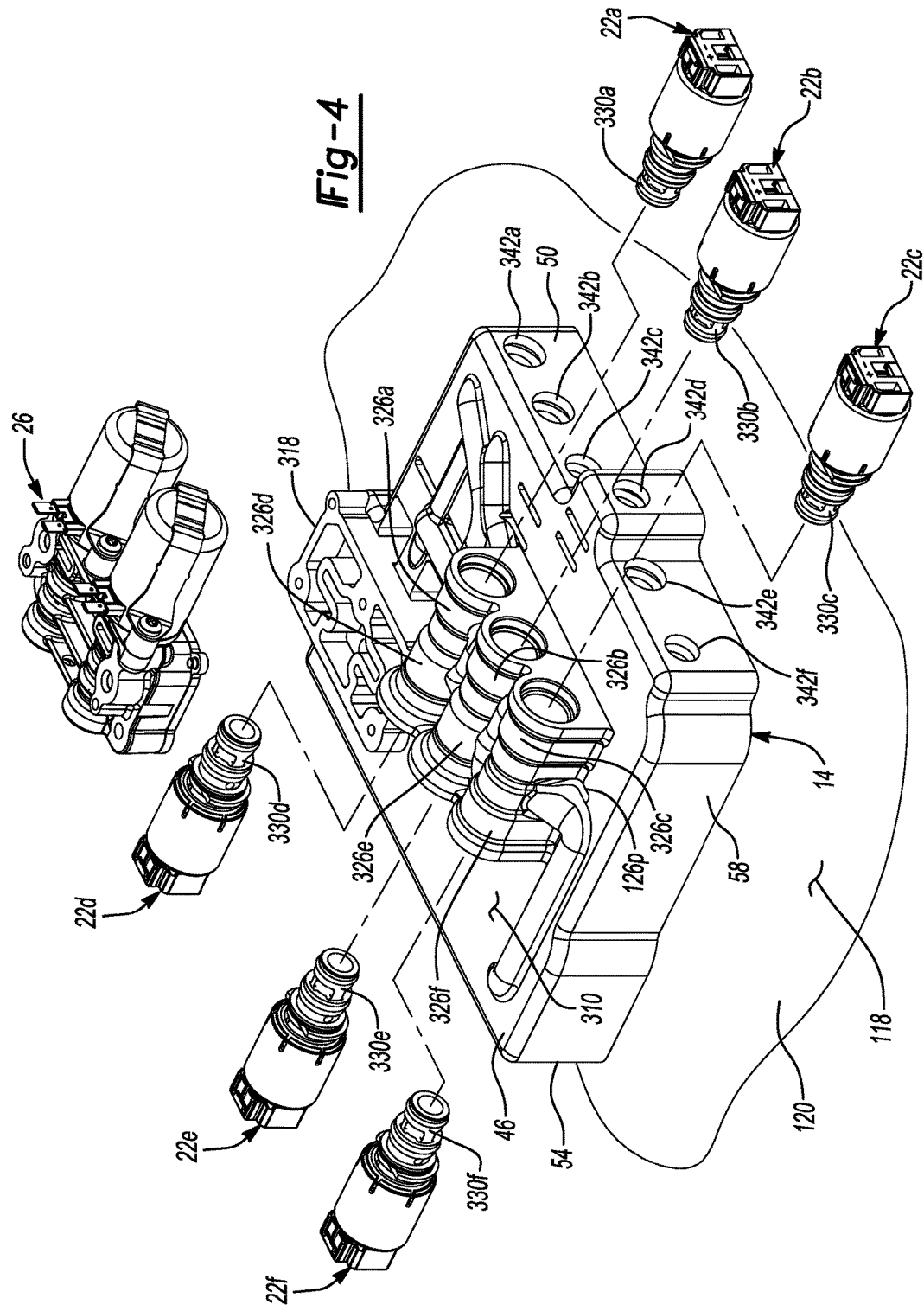
FIG. 4 is a different bottom perspective view of the transmission valve manifold shown in FIG. 1, illustrating some other components exploded out from the manifold body.

With specific reference to FIGS. 3 and 4, the bottom side 46 can have a bottom surface 310 and can include a plurality of solenoid actuator housings 314a, 314b, 314c, 314d, 314e, 314f that can extend down from the bottom surface 310. The bottom side 46 can also include a solenoid mount 318. The bottom surface 310 can include a plurality of additional vent apertures 126f, 126g, 126h, 126i, 126j, 126k, 126l, 126m, 126n, 126o, 126p. While the example provided includes eleven vent apertures on the bottom side, those of skill in the art will appreciate that other configurations or numbers of vents or mounts can be used. The vent apertures 126f-p are described in greater detail below.

In the example provided, the solenoid actuator housings 314a-f are aligned in opposing arrays across the bottom side 46 of the valve manifold body 14. Each solenoid actuator housing 314a-f can be hollow to include a generally cylindrical solenoid cavity 326a, 326b, 326c, 326d, 326e, 326f, whose axes can be generally parallel to the bottom surface 310 and transverse to the front side 50. In the example provided, the axes of the solenoid cavities 326a-f can be parallel to the axes of the piston cavities 130a-d, and 134a-d (FIGS. 1 and 2). In the example provided, the solenoid cavity 326a is coaxial with the solenoid cavity 326d, the solenoid cavity 326b is coaxial with the solenoid cavity 326e, and the solenoid cavity 326c is coaxial with the solenoid cavity 326f, though other configurations can be used. In the example provided, the forward axial ends of the solenoid actuator housings 314a-c are open and the rearward axial ends of the solenoid actuator housings 314a-c are closed by an integral wall of the solenoid actuator housings 314a-c, such that the solenoid cavities 326a-c are open toward the front side 50. In the example provided, the rearward axial ends of the solenoid actuator housings 314d-f are open and the forward axial ends of the solenoid actuator housings 314d-f are closed by an integral wall of the solenoid actuator housings 314d-f, such that the solenoid cavities 326d-f are open toward the back side 54 and the closed axial ends of the solenoid actuator housings 314a-f oppose each other.

Each solenoid cavity 326a-f can include a plurality of solenoid inlets/outlets open into the corresponding solenoid cavity 326a-f within the solenoid actuator housing 314a-f. In the example provided, the solenoid cavities 326a-f, each have at least two solenoid inlet/outlets 326a1, 326b1, 326c1, 326d1, 326e1, 326f1, 326a2, 326b2, 326c2, 326d2, 326e2, 326f2. In the example provided, the solenoid cavities 326d and 326e each have a third solenoid inlet/outlet 326d3, 326e3.

Each solenoid actuator 22a-f can include a valve sleeve 330a, 330b, 330c, 330d, 330e, 330f and a solenoid spool valve (not specifically shown) disposed within the corresponding solenoid cavity 326a-f. Each solenoid spool valve (not specifically shown) can be disposed within the valve sleeve 330a-f and configured to be axially positioned by an armature (not specifically shown) of the solenoid actuator 22a-f depending on an activation state of the solenoid actuator 22a-f. Each valve sleeve 330a-f of the solenoid actuator 22a-f can seal within the corresponding solenoid cavity 326a-f and be configured to selectively control flow of fluid through the corresponding inlets/outlets 326a1-f1, 326a2-f2, 326d3, 326e3. The solenoid actuators 22a-f can be on/off actuators, variable pressure actuators, or variable flow actuators and can receive electrical power from an electrical source (not shown) and can receive control signals from a control module (not shown).

The solenoid mount 318 can include a plurality of threaded mounting bores 334 such that the paired solenoid actuator 26 can be mounted to the solenoid mount 318 via threaded fasteners (not shown). In the example provided, the solenoid mount 318 defines a first cavity 338a, a second cavity 338b, and a third cavity 338c, open downward through the bottom surface 310. Each cavity 338a-c can include a corresponding inlet/outlet 338a1, 338b1, 338c1. The paired solenoid actuator 26 can be configured to selectively control flow of fluid between the cavities 338a-c.

The lead frame (not shown) can permit a wire harness (not shown) or other electrical communication circuit to be coupled to the solenoid actuators 22a-f or paired solenoid actuator 26 to provide selective control signals thereto from the control module (not shown).

In the example provided, the front side 50 can define a plurality of valve bores 342a, 342b, 342c, 342d, 342e, 342f and the back side 54 can define additional valve bores 342g, 342h. With additional reference to FIGS. 5-8, each valve bore 342a-h can open into a corresponding spool valve chamber 510a, 510b, 510c, 510d, 510e, 510f, 510g, 510h. Each spool valve 30a-h (FIGS. 1 and 2) can be axially slidably disposed within the corresponding spool valve chamber 510a-h, and can be sealed therein by a corresponding one of the spool valve cylinder caps 38a-h that can seal the valve bore 342a-h.

With additional reference to FIG. 11, an example of one of the spool valves 30a-h is illustrated in cross-section and generically indicated by numeral 1110. An example of the valve manifold body 14 is illustrated and generically indicated by reference numeral 1114. The manifold body 1114 can define a spool valve bore 1118 and a spool valve chamber 1122. The spool valve chamber 1122 can have a plurality of inlet/outlets 1126 at a corresponding plurality of ring areas 1130 that have a greater diameter than the diameter of the primary inner surface 1134 of the spool valve chamber 1122.

The spool valve 1110 can have at least one, and in the example provided, has a plurality of cylindrical sealing segments 1138, wherein the outer diameter of the spool valve 1110 is greater than the adjacent lengths of the spool valve 1110 such that the sealing segments 1138 can seal on the inner surface 1134, while fluid communication is permitted in the areas between adjacent ones of the sealing segments 1138. A spring 1142 can bias the spool valve 1110 in an axial direction within the spool valve chamber 1122. The spool valves 1110 and 30a-h (FIGS. 1 and 2) are illustrated as examples of spool valves for illustrative purposes only, and those of skill in the art will appreciate that the spool valves can be configured differently, such as being longer or shorter, having more or fewer segments, having segments of different lengths or diameters, etc., depending on the configurations of the corresponding spool valve chambers.

With specific reference to FIGS. 7A-7D, each spool valve chamber 510a-h can include a plurality of inlet/outlets, though other numbers and orientations of the inlet/outlets can be used other than those illustrated in the example provided. The axial position of each spool valve 30a-h (FIGS. 1 and 2) can determine how fluid is routed through the inlets/outlets of the spool valve chambers 510a-h. In the example provided, each spool valve chamber 510a-h can have a primary diameter, and each inlet/outlet can be located at either the axial end of the spool valve chamber 510a-h or a corresponding ring area where the spool valve chamber 510a-h has a diameter that is greater than the primary diameter. The spool valves 30a-h (FIGS. 1 and 2) can seal on the primary diameter while not seal on the ring areas.

In the example provided and listed in order from the front side 50 toward the back side 54, the spool valve chamber 510a can include five inlet/outlets 510a1, 510a2, 510a3, 510a4, 510a5. The spool valve chamber 510b can include five inlet outlets 510b1, 510b2, 510b3, 510b4, 510b5. The spool valve chamber 510c can include eleven inlet/outlets 510c1, 510c2, 510c3, 510c4, 510c5, 510c6, 510c7, 510c8, 510c9, 510c10, 510c11. The spool valve chamber 510d can include eighteen inlet/outlets 510d1, 510d2, 510d3, 510d4, 510d5, 510d6, 510d7, 510d8, 510d9, 510d10, 510d11, 510d12, 510d13, 510d14, 510d15, 510d16, 510d17, 510d18. The spool valve chamber 510e can include seven inlet/outlets 510e1, 510e2, 510e3, 510e4, 510e5, 510e6, 510e7. The spool valve chamber 510f can include four inlet/outlets 510f1, 510f2, 510f3, 510f4. The spool valve chamber 510g can include seven inlet/outlets 510g1, 510g2, 510g3, 510g4, 510g5, 510g6, 510g7. The spool valve chamber 510h can include two inlet/outlets 510h1, 510h2.

Returning generally to FIGS. 5-8, the inlet/outlets of the spool valve chambers 510a-h can be interconnected by a plurality of passageways formed within the valve manifold body 14 that can cross over, under, and around each other in three-dimensions to be multi-directional and multi-axial, and can have cross-sections that can vary in shape and cross-sectional area along the length of each passageway. The multi-directional passageways can extend along any of the x, y, and z axes of the valve manifold body 14 and can overlap or overlay other axial or multi-axial flow passageways in the valve manifold body 14.

Additionally, some of the passageways can provide fluid communication between inlet/outlets of the spool valve chambers 510a-h and a corresponding one of the vent apertures 126a-p to vent that inlet/outlet external of the valve manifold body 14. In the example provided, the solenoid actuators 22a-f, (FIG. 4), can direct fluid to select inlet/outlets of the spool valve chambers 510a-h to move the spool valves 30a-h (FIGS. 1, 2) axially. The axial position of the solenoid spool valve (not specifically shown) within the solenoid valve sleeve 330a-f and the spool valves 30a-h (FIGS. 1, 2) can direct fluid to select ones of the vent apertures 126a-p, the ports 122a-g, the inlet/outlets 130a1-d1, 134a1-134d1, 326a1-f1, 326a2-f2, 326d3, 326e3, 510a1-a5, 510b1-b5, 510c1-c9, 510d1-d16, 510e1-e7, 510f1-f4, 510g1-g7, 510h1-h2 to control the operation of select pressure controlled devices and/or the axial positions of the pistons 18a-d (FIG. 1), to control the shift position of the transmission 120 (FIG. 4).

For example, passageway 550 extends from inlet/outlet 510g2 to one of the vent apertures 126a-p and a portion of passageway 554 extends from inlet/outlet 510g3 to inlet/outlet 510g1, through a center of a toroidal shaped portion of passageway 550 such that passageway 554 extends through passageway 550 without being in direct fluid communication therewith. By way of another example, passageway 558 extends in an arcuate path along three axes (i.e., three directions, or in three-dimensions) from inlet/outlet 510a3 to inlet/outlet 510c8, arcing smoothly over spool valve chamber 510b. By way of another example, passageway 562 extends along three dimensions from inlet/outlet 510h1 to port 122c, to overlap with passageway 566, which is connected to port 122d.

While only some of the many fluid passageways shown in FIGS. 1-8 are specifically described herein, it is understood that at least one or a plurality of the passageways can be multi-dimensional, multi-axial fluid passageways, such as three dimensional, multi-directional overlaying fluid passageways 550, 554, 558, 562, 566, etc., extending along multiple three dimensional axes to provide fluid communication between two or more inlet/outlets and/or other fluid passageways. The fluid passageways can take any shape etc., such as linear shapes, tortuous shapes and a combination of linear and tortuous shapes and intersect the other fluid passages at any angle such as 90 degrees, 45 degrees, etc.

With additional reference to FIG. 9, a method of manufacturing the valve manifold body 14 (FIGS. 1-8) is illustrated. With additional reference to FIG. 10, a portion of a simplified example of the valve manifold body 14 (FIGS. 1-8) is shown for illustration purposes, and generally indicated with reference numeral 1010. The method of FIG. 9 is described herein with reference to the schematic, simplified valve manifold body 1010 for ease of description, and those of skill in the art would understand that the method can be used to manufacture the valve manifold body 14 shown in FIGS. 1-8. In the example shown in FIG. 10, the valve manifold body 1010 is shown partially manufactured.

The manufacturing process can include a laser sintering device 1014. The laser sintering device 1014 can be any suitable direct laser sintering apparatus and can generally include a laser 1018, a means for applying subsequent layers of powdered sintering material (e.g., metal powder 1022), and a control module 1026. In the example provided, the means includes a main surface 1030, a bore 1034, a platform 1038, and a roller 1042 (or other device for depositing the sintering material on the platform 1038). The bore 1034 is formed through the main surface 1030. The platform 1038 can be raised to be level with the main surface 1030 and can be lowered down therefrom into the bore 1034. The control module 1026 can control the position of the platform 1038. The roller 1042 can move back and forth across the bore 1034 while depositing a predetermined amount of metal powder 1022 on the platform 1038. The control module 1026 can control the roller 1042 to control the amount and timing of the deposition of the metal powder 1022. The control module 1026 can control operation of the laser 1018. The laser 1018 can be any suitable type of laser and can be configured to direct laser light energy to specific locations on the platform 1038.

The method can begin at step 910 with the platform located approximately at the height of the main surface 1030. The method can proceed to step 914, where the roller 1042 can move across the bore 1034 and deposit a layer of metal powder 1022 on the platform 1038. After applying the layer of metal powder 1022, the method can proceed to step 918.

At step 918, the control module 1026 can control the laser 1018 to direct laser light energy to specific points of the metal powder 1022 that are defined by a computer model of the finished valve manifold body 1010. Application of the laser energy to the metal powder 1022 can cause the metal powder at those points to melt/weld together at those points to form a layer of a solid structure. The laser 1018 can melt/weld the current layer to any immediately preceding layer, to cause the current layer to add to any previous layer to form a single, unitary, monolithic body. After applying the laser 1018, the method can proceed to step 922.

At step 922, the control module 1026 can determine if the final layer of the valve manifold body 1010 has been processed. If the final layer has been processed, then the method can proceed to step 926 and end. If the final layer has not been sintered, then the method can proceed to step 930.

At step 930 the platform 1038 can be lowered by a predetermined distance. The predetermined distance can be the width of a single sinterable layer of metal powder 1022. After the platform 1038 is lowered, the method can return to step 914 to apply a subsequent layer of metal powder 1022 to the platform 1038. The method can proceed in this manner, applying laser energy to subsequent layers of metal powder 1022 until the final layer of the valve manifold body 1010 is solidified as a single, unitary, monolithic body.

In the example provided by valve manifold body 1010, similar to valve manifold body 14 (FIGS. 1-8), the valve manifold body 1010 can include at least a first passageway 1050 that travels along a first path and a second passageway 1054 that travels along a second path through the valve manifold body 1010. The second passageway 1054 can cross under and over the first passageway in three-dimensions. In the example provided, the passageways 1050, 1054 can be representative of the passageways of the valve manifold body 14 (FIGS. 1-8)

This construction by the additive manufacturing process of laser sintering allows multiple fluid circuit crossovers in three dimensions and can infinitely vary the cross sectional shape of the fluid circuit. The cross section of each flow passage can also be varied from end to end. Because of the greater fluid circuit density, the need for multiple manifold bodies and gasketed plates and fasteners used in the prior art is eliminated.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "top," "bottom," "left," "right," "front," "back", "forward," "behind," "beneath," "below," "lower," "above," "over," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A transmission valve manifold comprising:
   a single, unitary, monolithic, manifold body, the manifold body having a plurality of fluid passageways, and a plurality of fluid chambers, each fluid chamber being configured to receive one of a cylinder body, a solenoid valve, or a spool valve;
   wherein a first one of the fluid passageways follows a path that extends along three axes through an interior of the manifold body to connect at least one of the fluid chambers with at least one other one of the fluid chambers, the first one of the fluid passageways extending through a second one of the fluid passageways within the interior of the manifold body; and
   wherein the first one of the fluid passageways is not in fluid communication with the second one of the fluid passageways at a location where the first one of the fluid passageways extends through the second one of the fluid passageways.

2. The transmission valve manifold of claim 1, wherein the single, unitary, monolithic manifold body consists essentially of laser sintered layers of a powdered material.

3. The transmission valve manifold of claim 1 further comprising:
   a plurality of solenoid actuators, each solenoid actuator being mounted to a corresponding one of the fluid chambers.

4. The transmission valve manifold of claim 3, wherein at least one of the solenoid actuators is one of an on/off actuator, a variable flow actuator, or a variable pressure actuator.

5. The transmission valve manifold of claim 1, further comprising a plurality of spool valves, each spool valve being disposed within a corresponding one of the fluid chambers.

6. The transmission valve manifold of claim 5, wherein each fluid chamber that corresponds to a spool valve has an inner cylindrical surface of a first diameter and includes a plurality of ring areas that have a diameter that is greater than the first diameter, the ring areas being axially spaced apart.

7. The transmission valve manifold of claim 1, further comprising:
   a plurality of first cylinder bodies and a plurality of second cylinder bodies, each of the first and second cylinder bodies being disposed within a corresponding one of the fluid chambers, each first cylinder body being fixedly coupled to one of the second cylinder bodies for common axial movement relative to the valve manifold body.

8. The transmission valve manifold of claim 7, wherein the manifold body defines a first set of the fluid chambers and a second set of the fluid chambers that is axially spaced apart from the first set of fluid chambers by a gap, each first cylinder body being axially slidable within one of the first set of fluid chambers and each second cylinder body being axially slidable within one of the second set of fluid chambers.

9. A transmission valve manifold comprising:
a single, unitary, monolithic, manifold body, the manifold body having a plurality of fluid passageways, a plurality of piston chambers, a plurality of spool valve chambers, and a plurality of solenoid valve chambers,
a plurality of actuator pistons each actuator piston having a first cylinder body and a second cylinder body that is fixedly coupled to the first cylinder body, each first cylinder body being slidably disposed within a corresponding first one of the piston chambers and each second cylinder body being slidably disposed within a corresponding second one of the piston chambers;
a plurality of spool valves, each spool valve slidably disposed within a corresponding one of the spool valve chambers; and
a plurality of solenoid valves mounted to the manifold body, each solenoid valve including a solenoid valve sleeve disposed within one of the solenoid valve chambers;
wherein each of the fluid passageways extends through the manifold body to connect at least one of the piston chambers with at least one of the spool valve chambers or at least one of the solenoid valve chambers, wherein a first one of the fluid passageways extends along three axes within the interior of the manifold body through a second one of the fluid passageways;
wherein the first and second ones of the fluid passageways are not in fluid communication with one another at a location where the first one of the fluid passageways extends through the second one of the fluid passageways.

10. The transmission valve manifold of claim 9, wherein the single, unitary, monolithic manifold body consists essentially of laser sintered layers of a powdered metal material.

* * * * *